April 12, 1966        J. MÜLLER        3,245,490

SUSPENSION FOR DRIVEN SWINGING HALF-AXLES

Filed Sept. 13, 1963        2 Sheets-Sheet 1

INVENTOR.
JOSEF MÜLLER
BY *Dicke + Craig*
ATTORNEYS.

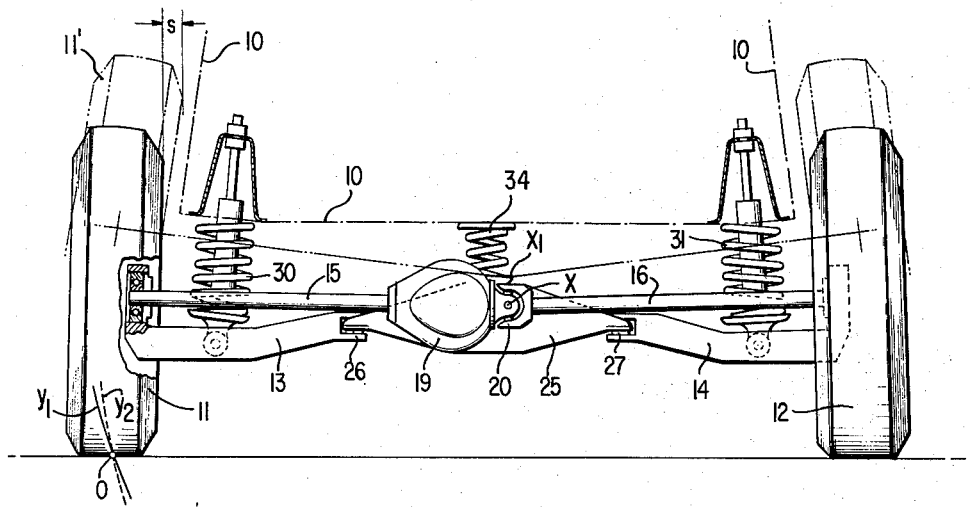
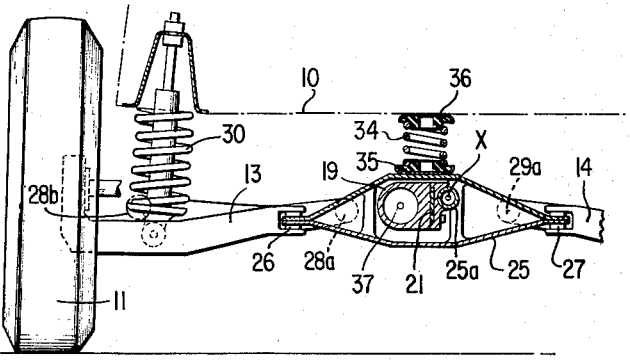
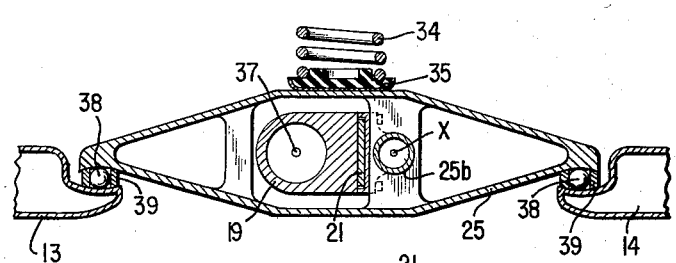
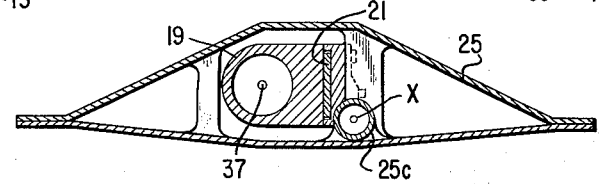

3,245,490
SUSPENSION FOR DRIVEN SWINGING HALF-AXLES

Josef Müller, Stuttgart-Riedenberg, Germany, assignor to Daimler-Benz Aktiengesellschaft, Stuttgart-Unterturkheim, Germany
Filed Sept. 13, 1963, Ser. No. 308,842
Claims priority, application Germany, Sept. 27, 1962, D 39,927
26 Claims. (Cl. 180—73)

The present invention relates to a suspension of vehicle wheels, preferably driven wheels, by means of swinging half-axle arms pivotal or swingable about a vehicle longitudinal axis, especially by means of such swinging half-axle arms which are supported in the vehicle longitudinal direction by thrust arms or thrust guide members.

Swinging half-axles have, aside from certain definite advantages, the disadvantage that they exhibit relatively more pronounced changes in the wheel tread. In order to eliminate this disadvantage it has already been proposed heretofore to pivotally connect the swinging half-axles below the wheel center, for example, in a common joint at the vehicle superstructure; however, in such a case the drive to the wheels becomes relatively complicated since two or even three joints as well as a telescopically displaceable joint shaft become necessary with an axle gear arranged at the height of the wheel center.

In contradistinction thereto, the present invention aims at a wheel suspension by means of swinging half-axle members which excels above all by a favorable wheel rise or wheel lift curve, i.e., that curve which the point of contact between the wheel and the road surface carries out relative to the vehicle superstructure during spring deflections, as well as by the possibility of a change in camber with a relatively simple construction of the drive.

Accordingly, the present invention essentially consists in that the bearer of the swinging half-axle members, to be referred to hereinafter as "axle-bearer," carries out a movement in the vertical direction with respect to the vehicle superstructure in dependence on the spring movements of one or both wheels, and more particularly participates in the stroke movements of the one or both wheels with only a partial stroke.

In one particularly advantageous embodiment of the present invention, the swinging half-axle members are supported in the vehicle longitudinal direction by thrust guide members or thrust arms which swing or pivot about an axis inclined to the driving direction and which thrust arms will be referred to hereinafter as "inclined guide members." Apart from the fact that the thrust guide members effectively relieve the swinging half-axle members from the forces acting in the driving direction and simultaneously therewith enable a structurally favorable vehicle construction, they also entail a further improvement in the roadability and more particularly in that case when the swinging axes of the inclined guide members intersect the vertical center plane of the associated wheel or swinging half-axle member on the vehicle side disposed opposite to the respective wheel. A wheel rise curve that approaches the vertical in a particularly far-reaching manner can be achieved thereby.

The movement of the axle bearer depending on the wheel spring stroke is achieved in the simplest possible and most appropriate manner by the fact that the axle bearer, especially in the form of a transverse member or cross bearer, is supported on the two thrust arms, preferably on inclined guide members. Preferably the axle bearer is rotatably supported about a vehicle longitudinal axis on an intermediate member whereby the axle bearer may be elastically supported with respect to the vehicle superstructure by means of a springy or yielding device against rotation about the vehicle longitudinal axis.

Axle drive shafts may serve as a substantial part of the swinging half-axle members which are driven from the axle gear. In particular, the axle gear housing may itself form a part of one swinging half-axle member in that one of the two axle shafts directly connects the axle gear with one of the wheels. The axle shaft may be supported thereby within the axle gear housing and may also be connected with the wheel without any joints so that the axle gear housing and the axle shaft are able to swing or pivot together with the associated wheel as swinging half-axle member at the axle bearer about the longitudinal pivot axis forming the joint axis of the swinging half-axle members and participating in the wheel stroke. The other wheel may be driven by way of a Cardan joint which operatively connects the axle gear with the other axle shaft directly driving the other wheel and forming the second swinging half-axle member and which is disposed in the aforementioned longitudinal pivot axis between the axle bearer and the first-mentioned swinging half-axle member.

The axle bearer or the swinging half-axle member pivotally connected therewith is preferably supported against the vehicle superstructure in the vehicle longitudinal direction by a brace or strut member, whereby the brace or strut member may serve simultaneously for the elastic support of the axle bearer or of the swinging half-axle member about the longitudinal axis thereof. The brace or strut element is preferably constructed as a torsionally resilient strut or brace member, especially as upright leaf spring which is pivotally connected with one end thereof at the vehicle superstructure and which is rigidly connected at the other end thereof with the aforementioned swinging half-axle member.

The support of the axle bearer on the thrust guide members takes place preferably between the swinging or pivot axes thereof and the pivotal connection thereof at the wheel carriers or swinging half-axle members, especially in such a manner that the stroke movement of the inner ends of the swinging half-axle members amounts to about one-half to one-third of the spring stroke of the wheels with equally large uni-directional spring strokes of both wheels, i.e., equally large spring strokes in the same direction.

The following is achieved above all by the present invention:

If one of the two wheels is spring-deflected by swinging or pivoting together with the associated swinging half-axle member about the longitudinal pivot axis thereof at the axle bearer or at the other swinging half-axle member, then the axle bearer is forcibly taken along partly in the stroke direction of the wheel by the thrust guide arms or inclined guide members. The relative stroke between wheel and axle bearer is thereby reduced and the otherwise relatively strongly curved wheel rise curve is straightened out, whereby, in particular, the change in wheel tread is reduced; this the more if the swinging or pivot axis of the inclined guide member serving as thrust guide arm intersects the vertical transverse plane through the wheel centers on the opposite vehicle side. Furthermore, the camber produced during spring movements of the wheels is reduced.

Since the axle bearer carries out the movements of the thrust guide members or of the wheels only with a partial stroke, the unsprung mass of the axle system is only slight notwithstanding the support at the vehicle superstructure since the inertia effect of the mass of the axle system decreases with the square of the reduced spring stroke. The mass inertia may be kept particularly small by a corresponding positioning of the support points.

As compared with the so-called single-joint swinging half-axles having a relatively low pivot axis extending in the longitudinal direction of the vehicle, the present invention produces the further advantage that no or practically only very small transversely movable masses of the axle system are present. As a result thereof, smaller structures for the installations of the wheels at the vehicle body or vehicle frame and more favorable frame constructions are made possible thereby. The tilting angle of the wheels and the angular movements within the joints are smaller than with the constructions known heretofore. Sliding joints in the axle shaft are no longer required or only with so little play in the sliding direction that for the absorption of the friction work occurring therewith no special measures such as the installation of ball or roller guide means or the like become necessary.

Since the principal support of the axle bearer takes place on the thrust guide members, the frame cross bearer member otherwise utilized or located to the rear of the axle bearer, especially an axle gear housing, may be dispensed with. Additionally, the transmission of noise from the gear wheels of the axle gear to the vehicle body takes place only by way of intermediate members, possibly with the exception of the support point between the brace or strut member connected with one swinging half-axle member or the axle gear housing, on the one hand, and the vehicle superstructure, on the other.

Preferably the axle bearer is supported on the thrust arms or inclined guide members as well as at the vehicle superstructure by the interposition of elastic cushions. Additionally, the inclined guide members are constructed in a particularly simple and appropriate manner of star- or fork-shaped configuration and are supported, on the one hand, at the vehicle superstructure in proximity to the vehicle longitudinal center axis and, on the other, in proximity to the vehicle outer body panels corresponding to the inclined swinging or pivot axis thereof.

Each of the inclined guide members can also be welded together of a hollow main arm and of a hollow auxiliary arm so that they absorb in a particularly reliable manner the forces acting thereagainst. Furthermore, the thrust guide members may also be constructed, without difficulty, in such a manner that they permit relatively strong longitudinal frame bearers.

The wheel suspension according to the present invention also makes it possible to achieve in a simple manner a further improvement of the roadability and of the spring system by the provision of an equalization spring in that the axle bearer is additionally spring-supported against the vehicle superstructure, in addition to the spring-support of the main spring system, preferably by means of a rubber spring or a coil spring supported within rubber, within the area of the vertical center longitudinal plane which contains the support of the one of the swinging half-axle members or of the axle gear housing at the vehicle superstructure and the Cardan joint for the connection of the axle shaft forming the other swinging half-axle member with the first swinging half-axle member or with the axle gear including the same. Such an equalization spring may be installed according to the present invention without separate levers or analogous intermediate members or, depending on the particular use, may also be omitted altogether.

Accordingly, it is an object of the present invention to to provide an independent wheel suspension of the type described above, especially for the driven wheels of a vehicle, which obviates by simple means the disadvantages and drawbacks encountered with the prior art constructions.

It is another object of the present invention to provide an independent wheel suspension of the swinging half-axle type, particularly for the driven wheels of a vehicle, which significantly reduces changes in wheel tread during spring deflections of the vehicle wheels.

Still another object of the present invention resides in the provision of an independent wheel suspension for the driven wheels of a vehicle which includes swinging half-axles yet requires only a relatively simple driving arrangement and obviates numerous joints and telescopically slidable joint shafts.

A still further object of the present invention resides in the provision of a swinging half-axle-type independent wheel suspension for vehicle wheels which considerably improves the curve described by the point of contact between the wheel and the road surface relative to the vehicle superstructure during spring deflections of the wheels, and more particularly provides a curve that approaches more nearly a vertical straight line, representing theoretically optimum conditions.

Still another object of the present invention resides in the provision of a swinging half axle where suspension for driven wheels in which the axle drive means as well as the axle bearer participate in the spring movements of the wheels though at predetermined reduced ratios.

Another object of the present invention resides in the provision of an independent wheel suspension of the swinging half-axle type in which the half-axle members or guide arms are effectively relieved of the longitudinal forces acting in the driving direction of the vehicle.

A further object of the present invention resides in the provision of an independent wheel suspension for the driven wheels of a vehicle utilizing swinging half-axle type members which offers improved roadability, permits more favorable constructions as regards vehicle frame or analogous parts, and at the same time decreases the camber normally resulting heretofore during spring deflections of the wheels with similar prior art wheel suspensions.

Still a further object of the present invention resides in the provision of an independent wheel suspension of the type described hereinabove in which the unsprung mass of the axle system is only relatively small notwithstanding the support at the vehicle superstructure and in which the mass inertia can be kept relatively low.

Still another object of the present invention resides in the provision of a wheel suspension of the type mentioned hereinabove in which, at the most, only very small transversely movable masses are present in the axle system thereby reducing the dimensions for the parts used with the installation of the wheels at the vehicle body or superstructure and permitting a more favorable and purposeful construction of the frame.

Another object of the present invention resides in the provision of a wheel suspension utilizing swinging half-axles in which the sliding joints in the axle shafts require only so little play that no special measures in the form of bearings or the like are necessary to absorb the resulting friction work.

A further object of the present invention resides in the provision of a swinging half-axle type wheel suspension which simplifies the construction of the main frame, minimizes favorably the transmission of noises from the axle gear to the vehicle body and enables the use of an equalization spring that can be readily installed without any difficulty.

Still another object of the present invention resides in the provision of a swinging half-axle wheel suspension for the driven wheels of a vehicle provided with thrust arms or guide members operable to brace the half-axles in the longitudinal direction of the vehicle which are so constructed and arranged, in an extremely appropriate and simple manner that they are able to absorb reliably all forces acting thereagainst.

These and other objects, features and advantages of the present invention will become more obvious from the following description when taken in connection with the accompanying drawing which shows, for purposes of illustration only, several embodiments in accordance with the present invention, and wherein FIGURE 1 is a plan view of an axle arrangement in accordance with the present invention;

FIGURE 3 is a rear elevational view of the wheel suspension of FIGURES 1 and 2;

FIGURE 4 is a partial cross sectional view, taken along line 4—4 of FIGURE 2;

FIGURE 5 is a cross sectional view of a first embodiment for the support of the axle bearer on the thrust arms or inclined guide members in accordance with the present invention;

Figure 1:
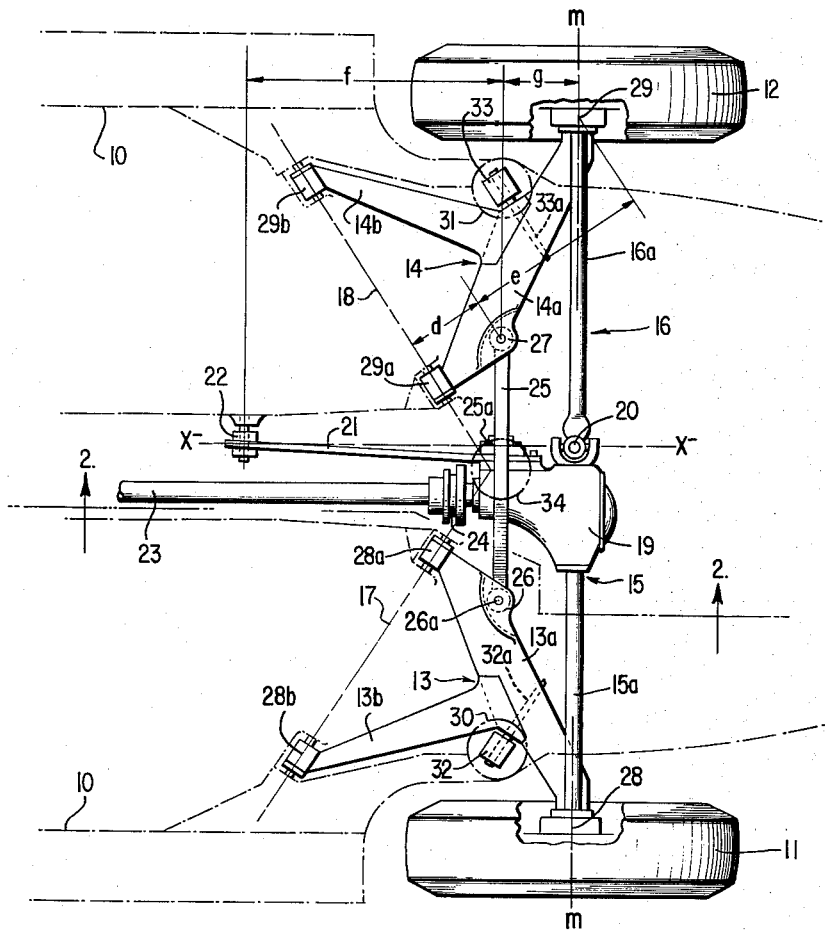
Figure 2:
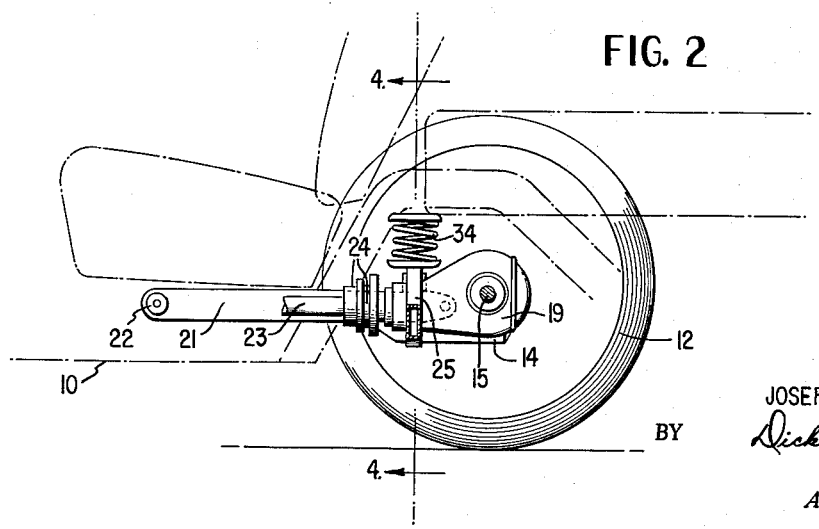
FIGURE 2 is a cross sectional view taken along line 2—2 of FIGURE 1.

FIGURE 6 is a cross sectional view, similar to FIGURE 5, of a second embodiment for the support of the axle bearer on the thrust arms in accordance with the present invention; and FIGURE 7 is a diagram, on an enlarged scale, for the wheel rise curve, i.e., the curve described by the point of contact between the wheel and the road surface relative to the vehicle superstructure during spring deflections of the wheel.

Referring now to the drawing wherein like reference numerals are used through out the various views to designate like parts, reference numeral 10 designates therein a vehicle superstructure which may be of any conventional construction, such as a vehicle frame or a self-supporting type body construction. The rear wheels 11 and 12 of the vehicle are suspended independently of one another at the vehicle superstructure 10 by means of the swinging half-axle members generally designated by reference numerals 15 and 16. The swinging half-axle members 15 and 16 are formed in the main by the axle shafts 15a and 16a with which the wheels are rigidly connected, and are supported or braced forwardly in the driving direction by thrust arms generally designated by reference numerals 13 and 14 and constructed as inclined guide members. The thrust arms or guide members 13 and 14 swing or pivot about the axes 17 and 18, respectively, which extend obliquely to the longitudinal axis of the vehicle and intersect the vertical transverse plane $m$—$m$ extending through the center of the wheels 11 and 12 respectively on the opposite side of the vertical longitudinal center plane of the vehicle in relation to the associated wheel.

The swinging half-axle member 15 further includes, in addition to the axle shaft 15a, the axle gear housing 19 within which the axle shaft 15a is so supported that it forms a rigid unit together with the axle gear housing 19 in the vertical and horizontal planes. The other axle shaft 16a is driven from the axle gear within the axle gear housing 19 by way of Cardan joint 20 which simultaneously therewith forms the jointed connection of two swinging half-axle members 15 and 16. The strut or brace member 21 is rigidly connected with the axle gear housing 19, for example, it is secured by threaded means laterally at the housing 19. The strut member 21 is constructed as an upright leaf spring and is pivotally connected with the vehicle superstructure 10 at 22 by the interposition of rubber cushions.

The drive of the axle gear takes place in the usual manner by way of a shaft 33 provided with a Cardan joint 24. The shaft 23 is driven in turn, for example, from a forwardly disposed engine by way of a change-speed transmission.

The axle bearer 25 is constructed as a rigid transverse member or cross bearer. The axle gear housing 19 is connected with the axle bearer 25 by means of a joint 25a, the joint axis of which forms the swinging axis $x$—$x$ of the swinging half-axle members 15 and 16, with the swinging axis $x$—$x$ extending in the longitudinal direction of the vehicle and being according to the present invention adapted to move in the upward direction. In the illustrated embodiment of FIGURES 3 and 4, the joint axis, designated therein by reference character X, coincides with a straight line that connects the Cardan joint 20 with the center of the rubber joint 22. The support of the axle bearer 25 on the thrust arms or inclined guide members 13 and 14 takes place, for example, by means of rubber cushions or buffers 26 and 27. To assure against transverse displacements the axle bearer 25 may be secured at one of the supporting places thereof, for example, at the supporting place of the rubber cushion 26 by means of a bolt 26a or the like.

Since the thrust arms or inclined guide members 13 and 14 swing or pivot about the inclined axes 17 and 18 while the swinging half-axle members 15 and 16 swing or pivot about the longitudinal axis $x$—$x$, the wheels 11 and 12 together with the axle shafts 15a and 16a forming in the main swinging half-axle members are supported within the thrust guide members 13 and 14 by any appropriate known means 28 and 29 in such a manner as to permit universal movement, that is, movement in all directions. Since such universal supports are well-known in the art, they are not specifically shown and described herein, and may be constructed in any conventional manner known in the prior art for such universal joints, for example, by elastic cushions or the like.

The inclined guide members 13 and 14 are composed of sheet metal parts pressed into star- or fork-shaped hollow bodies. The inclined guide members 13 and 14 consist essentially of a main arm 13a and 14a and of an auxiliary arm 13b and 14b, respectively, whereby the latter are welded in each case to the former approximately in the center of a respective main arm. The thrust arms or inclined guide members 13 and 14 are pivotally connected or secured, on the one hand, at the main arm 13a and 14a in proximity to the center longitudinal axis of the vehicle by means of eye portions 28a and 29a of corresponding connecting joints and at the auxiliary arms 13b and 14b thereof in proximity to the vehicle outer body walls by means of eye portions 28b and 29b of corresponding connecting joints, respectively.

Coil springs 30 and 31 serve for the spring-support of the wheels which are supported at the inclined guide members 13 and 14 approximately at the place of connection of an auxiliary arm at the main arm by means of joints 32 and 33 respectively. The joint pins 32a and 33a extend through the main arm of the thrust arms or inclined guide members 13 and 14 in such a manner that they assure a stable support for the coil springs 30 and 31.

Furthermore, an equalization spring in the form of a vertical coil spring 34 is provided which is supported with the lower end thereof against the axle bearer 25 and which the upper end thereof against the vehicle superstructure 10 in each case by the interposition of rubber cushions 35 and 36 (FIGURE 4). The equalization spring 34 is arranged approximately in the center longitudinal plane of the vehicle or in proximity to the swinging axis $x$—$x$ of the swinging half-axle members 15 and 16.

If both wheels are spring deflected in unison in the upward direction, then they take along by means of the thrust arms or inclined guide members 13 and 14 the axle bearer 25 supported thereon and therewith the axle gear housing 19, that is the inner ends of the swinging half-axle members 15 and 16. However, these parts participate in the stroke movements of the wheels only with a partial stroke. The stroke of the axle bearer 25 thereby amounts to $$\frac{d}{d+e}$$

of the wheel stroke whereas the movements of the inner ends of the swinging half-axle members 15 and 16 in the transverse plane $m$—$m$ is greater in relation to the stroke of the axle bearer 25 by the ratio of $$\frac{f+g}{f}$$

whereby the distances $d$, $e$, $f$ and $g$ can be seen in FIGURE 1.

The inner end of the swinging half-axle member 15 together with the axle gear housing 19 and the joint 20 of the swinging half-axle member 16 thus carries out, on the one hand, a movement or stroke in the vertical direction which amounts to a partial stroke of the wheels, in that it swings about a transverse axis extending through the pivot point of the joint 22. On the other hand, the swinging half-axle members 15 and 16 swing or pivot about the longitudinal axis $x$—$x$ whereby they fold or bend with respect to each other in the upward or downward direction within the joint 20.

If the pivot axis $x$—$x$ is designated in FIGURE 3 by reference character X and if O designates the point of contact of the wheel 11 with the road surface, then the point O would carry out with respect to the vehicle superstructure 10 a movement $y_1$ forming the wheel rise curve if the axle gear housing 19 were rigidly arranged at the vehicle superstructure 10. However, since according to the present invention the point X is displaced during the spring stroke by movements of the wheels in the upward direction, for example, to the point $X_1$, corresponding points along the curve $y_1$ are also displaced in the upward direction so that altogether a curve $y_2$ results which extends more nearly in the vertical direction. The curves $y_1$ and $y_2$ are again shown once more on an enlarged scale in FIGURE 7.

In the embodiment of FIGURES 1 to 4, it is assumed that the joint $25a$ between the one swinging half-axle member 15 or the axle gear housing 19 and the axle bearer 25 is disposed at the height of the wheel center, whereas, for example, the inclined or oblique axes 17 and 18 of the thrust arms extend below this wheel center. In lieu thereof, as illustrated in FIGURE 5, the joint, designated therein by reference numerals $25b$, that is, the swinging axis $x$—$x$ or X of the swinging half-axle arms, which is displaceable in the vertical direction, may also be located at a lower point, for example, at the height of the center 37 of the axle gear housing 19 or, as shown in the still further modified embodiment of FIGURE 6, in which this axis is designated by reference numeral $25c$, still lower than in the center 37 of the axle gear housing 19. Depending on the location of the center 25, the wheel lift or wheel rise curve $y_2$ can be displaced in the upward or downward direction.

In the embodiment according to FIGURE 4, the axle bearer 25 is supported at the ends thereof by means of two rubber cushions 26 and 27 on the thrust arms or inclined guide members 13 and 14 in the upward and downward directions. Another type of support is illustrated in FIGURE 5 in which balls 38 are interposed between the axle bearer 25 and the thrust guide arms 13 and 14. Rubber rings 39 suitably connected with the axle bearer 25 and the thrust guide arms 13 and 14, for example, by bonding or vulcanization, are able to secure the axle bearer 25 against any lifting off from the thrust guide arms 13 and 14.

As compared to a swinging half-axle suspension with a fixed, relatively low longitudinal swinging axis, the wheel suspension according to the present invention further entails the advantage that during upward spring deflections of the wheels the latter carry out only a slight relative movement in the transverse direction of the vehicle in relation to the vehicle superstructure. For example, the wheel 11 in the upwardly deflected uppermost position thereof assumes, with an arrangement in accordance with the present invention, the position 11' (FIGURE 3). The amount S of the inward movement of the point of the wheel thereby displaced the furtherest distance inwardly is relatively small in comparison to the usual swinging half-axles. Consequently, a relatively sturdy longitudinal bearer of large dimensions of the vehicle superstructure, for example, of an independent frame or of a frame combined with the vehicle body may also be provided in the arrangement according to the present invention.

While I have shown and described several embodiments in accordance with the present invention, it is understood that the same is not limited thereto but is suspectible of numerous changes and modifications within the spirit and scope thereof and I therefore do not wish to be limited to the details shown and described herein but intend to cover all such changes and modifications as are encompassed by the scope of the appended claims.

I claim:

1. A wheel suspension for independently suspending vehicle wheels from a vehicle superstructure, comprising:

two swinging half-axle means swingable about a substantially longitudinal vehicle axis, each swinging half-axle means being connected to a respective vehicle wheel, axle bearer means for said swinging half-axle means, and means operatively connecting said axle bearer means with at least one of asid swinging half-axle means in such a manner that said axle bearer means partially carries out movements substantially in the vertical direction relative to said vehicle superstructure in dependence on the spring movements of said one wheel, including thrust arm guide means for supporting said two swinging half-axle means in the longitudinal direction of the vehicle, said thrust arm guide means being constructed as inclined guide members with the pivot axes thereof inclined at an angle to the vehicle longitudinal axis, the pivot axis of an inclined guide member intersecting a transverse plane passing through the wheel center on the side of said vehicle longitudinal axis opposite the associated vehicle wheel, said axle bearer means being supported on the thrust arm guide means on both sides of the vehicle, said swinging half-axle means being formed principally by rotatable axle shafts rigidly connected with the respective wheels, and one of said swinging half-axle means including also axle gear housing means by means of which said one swinging half-axle means is pivotally connected with said axle bearer means for swinging movements about a longitudinal swinging axis, an axle gear within said axle gear housing means, and driving joint means for drivingly connecting the other axle shaft forming the other swinging half-axle means with said axle gear.

2. A wheel suspension for independently suspending driven vehicle wheels from a vehicle superstructure, comprising:

two swinging half-axle means swingable about a substantially longitudinal vehicle axis, each swinging half-axle means being connected to a respective vehicle wheel, axle bearer means supporting at least one of said swinging half-axle means at the inner ends thereof,
and means operatively connecting said axle bearer means with at least one of said swinging half-axle means in such a manner that said axle bearer means partially carries out movements substantially in the vertical direction relative to said vehicle superstructure in dependence on the spring movements of said one wheel,
said axle bearer means, which supports said swinging half-axle means for swinging movements about a vehicle longitudinal axis being constructed as a rigid hollow bearer.

3. A wheel suspension for independently suspending driven vehicle wheels from a vehicle superstructure, comprising:
two swinging half-axle means swingable about a substantially longitudinal vehicle axis, each swinging half-axle guide means being connected to a respective vehicle wheel,
axle bearer means for said swinging half-axle means,
and means operatively connecting said axle bearer means with at least one of said swinging half-axle means in such a manner that said axle bearer means carries out movements substantially in the vertical direction relative to said vehicle superstructure in dependence on the spring movements of said one wheel,
thrust arm guide means for supporting said two swinging half-axle means in the longitudinal direction of the vehicle,
said axle bearer means being supported on said thrust arm guide means in places located between the vehicle transverse plane containing said swinging half-axle means and the effective support of said swinging half-axle means at said vehicle superstructure.

4. A wheel suspension for independently suspending driven vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means operatively connecting said axle bearer means with at least one of said swinging half-axle means in such a manner that said axle bearer means partially carries out movement substantially in the vertical direction relative to said vehicle superstructure in dependence on the spring movements of said one wheel,
thrust arm guide means for supporting said two swinging half-axle means in the longitudinal direction of the vehicle,
said axle bearer means being supported on said thrust arm guide means in places located between the pivot axes thereof at the vehicle superstructure and the operative connection thereof with the swinging half-axle means.

5. A wheel suspension for independently suspending vehicle wheels from a vehicle superstructure, comprising:
two swinging half-axle means swingable about a substantially longitudinal vehicle axis, each swinging half-axle means being connected to a respectvie vehicle wheel,
axle bearer means for said swinging half-axle means,
and means operatively connecting said axle bearer means with at least one of said swinging half-axle means in such a manner that said axle bearer means partially carries out movements substantially in the vertical direction relative to said vehicle superstructure in dependence on the spring movements of said one wheel,
and thrust arm guide for supporting said two swinging half-axle means in the longitudinal direction of the vehicle,
and means for supporting said axle bearer means on said thrust arm guide means, on the one hand, and said swinging half-axle means at the vehicle superstructure, on the other, in such a manner that the stroke movements of the inner ends of the swinging half-axle means within the transverse plane through the centers of the wheels amounts to about one-half to one-third of the spring strokes of the wheels with equally large, unidirectional spring strokes of both wheels.

6. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means operatively connecting said axle bearer means with at least one of said swinging half-axle means in such a manner that said axle bearer means partially carries out movements substantially in the vertical direction relative to said vehicle superstructure in dependence on the spring movements of said one wheel,
and thrust arm guide means for supporting said two swinging half-axle means in the longitudinal direction of the vehicle,
and elastic cushion means for supporting said axle bearer means at least on one of said thrust arm guide means and said vehicle superstructure.

7. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means operatively connecting said axle bearer means with at least one of said swinging half-axle means in such a manner that said axle bearer means partially carries out movements substantially in the vertical direction relative to said vehicle superstructure in dependence on the spring movements of said one wheel,
and thrust arm guide means for supporting said two swinging half-axle means in the longitudinal direction of the vehicle,
and means for supporting said axle bearer means on each thrust arm guide means in the direction of rotation about said longitudinal vehicle axis by the interposition of two elastic cushion means.

8. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means operatively connecting said axle bearer means with at least one of said swinging half-axle means in such a manner that said axle bearer means partially carries out movements substantially in the vertical direction relative to said vehicle superstructure in dependence on the spring movements of said one wheel,
and thrust arm guide means for supporting said two swinging half-axle means in the longitudinal direction of the vehicle,
and means for supporting said axle bearer means on each thrust arm guide means in the direction of rotation about said longitudinal vehicle axis by the interposition of two elastic cushion means and ball-shaped means.

9. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means operatively connecting said axle bearer means with the outer end of at least one of said swinging half-axle means in such a manner that said axle bearer means partially carries out movements substantially in the vertical direction relative to said vehicle superstructure in dependence on the spring movements of said one wheel,
including thrust arm guide means for supporting said two swinging half-axle means in the longitudinal direction of the vehicle,
each thrust arm guide means including a main arm provided with one bearing eye means and with the pivotal connecting means for the associated swinging half-axle means and an auxiliary arm welded to said main arm at an angle and provided with another bearing eye means, both of said thrust arm guide means constituted by hollow sheet-metal stampings, said axle bearer means being supported on the main arm, and wheel spring means supported within the area of said main arm.

10. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means including thrust arm guide means operatively connecting said axle bearer means with the outer end of at least one of said swinging half-axle means in such a manner that said axle bearer means partially carries out movements substantially in the vertical direction relative to said vehicle superstructure in dependence on the spring movements of said one wheel,
and equalization spring means for spring supporting said axle bearer means against said vehicle superstructure, said equalization spring means being additional to the springs of the spring system for the wheels and being disposed within the area of the vertical longitudinal plane containing said longitudinal swinging axis.

11. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and means including thrust arm guide means operatively connecting said axle bearer means with the outer end of at least one of said swinging half-axle means in such a manner that said axle bearer means partially carries out movements substantially in the vertical direction relative to said vehicle superstructure in dependence on the spring movements of said one wheel,
and equalization spring means including a coil spring supported in elastic cushion means for spring supporting said axle bearer means against said vehicle superstructure, said equalization spring means being additional to the springs of the spring system for the wheels and being disposed within the area of the vertical longitudinal plane containing said longitudinal swinging axis.

12. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
and thrust arm guide means having pivot axes extending obliquely to the longitudinal direction of the vehicle for supporting said two swinging half-axle means in the longitudinal direction of the vehicle,
and means including said thrust arm guide means operatively connecting said axle bearer means near the outer ends of both of said swinging half-axle means in such a manner that said axle bearer means partially carries out movement in the vertical direction relative to said vehicle superstructure in dependence on the spring movements of the wheels.

13. A wheel suspension for independently suspending driven vehicle wheels from a vehicle superstructure, comprising:
two swinging half-axle means swingable about a substantially longitudinal vehicle axis, each swinging half-axle means being connected to a respective vehicle wheel,
axle bearer means for said swinging half-axle means,
pivotal means pivotally supporting said swinging half-axle means on said axle bearer means in such a manner as to enable pivotal movement of said swinging half-axle means about said longitudinal axis,
and thrust arm guide means having pivot axes extending obliquely to the longitudinal direction of the vehicle for supporting said two swinging half-axle means in the longitudinal direction of the vehicle,
and means including said thrust arm guide means operatively connecting said axle bearer means near the outer ends of both of said swinging half-axle means in such a manner that said axle bearer means partially carries out movements in the vertical direction relative to said vehicle superstructure in dependence on the spring movements of the wheels,
said connecting means including means to cause said axle bearer means to participate in the spring movements of said wheels only with a partial stroke.

14. A wheel suspension for independently suspending vehicle wheels from a vehicle superstructure, comprising,
two swinging half-axle means swingable about a substantially longitudinal vehicle axis, each swinging half-axle means being connected to a respective vehicle wheel,
axle bearer means for said swinging half-axle means,
and means operatively connecting said axle bearer means with at least one of said swinging half-axle means in such a manner that said axle bearer means partially carries out movements substantially in the vertical direction relative to said vehicle superstructure in dependence on the spring movements of said one wheel,
said connecting means including means to cause said axle bearer means to participate in the spring movements of said one wheel only with a partial stroke,
and thrust arm guide means having pivot axes extending obliquely to the longitudinal direction of the vehicle for supporting said two swinging half-axle guide means in the longitudinal direction of the vehicle,
said thrust arm guide means being constructed as inclined guide members with the pivot axes thereof inclined at an angle to the vehicle longitudinal axis, the pivot axis of an inclined guide member intersecting a transverse plane passing through the wheel center of the vehicle on the side of said vehicle longitudinal axis opposite the associated vehicle wheel, said axle bearer means being supported on the thrust arm guide means on both sides of the vehicle, said swinging half-axle means being formed principally by rotatable axle shafts rigidly connected with the respective wheels, and one of said swinging half-axle means including also axle gear housing means, by means of which said one swinging half-axle means is pivotally connected with said axle bearer means for swinging movements about a longitudinal swinging axis, an axle gear within said axle gear housing means, and driving joint means for drivingly connecting the other axle shaft forming the other swinging half-axle means with said axle gear, said driving joint means being disposed substantially in said longitudinal swinging axis and forming simultaneously the joint of said other swinging half-axle means, strut means rigidly connected with said one swinging half-axle guide means for bracing said one swinging half-axle means at said vehicle superstructure including pivotal connecting means connecting said strut means with said superstructure to provide a transverse pivot axis, said axle bearer means being constructed as rigid hollow bearer, said axle bearer means being supported on said thrust arm guide means in places located between the vehicle transverse plane containing said swinging half-axle means and the effective support of said swinging half-axle means at said vehicle superstructure, said axle bearer means being supported also on said thrust arm guide means in places located between the pivot axes thereof at the vehicle superstructure and the pivotal connection thereof with the swinging half-axle means, universal joint means operatively connecting said swinging half-axle means with thrust arm guide means, the support of said axle bearer means on said thrust arm guide means, on the one hand, and the support of said swinging half-axle means at the vehicle superstructure, on the other, being so arranged that the stroke movements of the inner ends of the swinging half-axle means within the transverse plane through the centers of the wheels amounts to about one-half to one-third of the spring strokes of the wheels with equally large spring strokes of both wheels in the same direction, the thrust arm guide means being of approximately star shape and having a plurality of leg portions and being supported at said vehicle superstructure by means of a first leg portion in proximity to the longitudinal vehicle center axis and by means of a second leg portion in proximity to a respective vehicle outer side, while the third leg portion is operatively connected with a respective vehicle wheel, the swinging axis of said swinging half-axle means being located approximately at a height at the most equal to the height of the longitudinal swinging axis of the swinging half-axle means.

15. A wheel suspension for independently suspending driven vehicle wheels from a vehicle superstructure, comprising:

two swinging half-axle means swingable about a substantially longitudinal vehicle axis, each swinging half-axle means being connected to a respective vehicle wheel, axle bearer means for said swinging half-axle means, pivotal means pivotally supporting said swinging half-axle means on said axle bearer means in such a manner as to enable pivotal movement of said swinging half-axle means about said longitudinal vehicle axis, and means operatively connecting said axle bearer means with the outer end of at least one of said swinging half-axle means in such a manner that said axle bearer means partially carries out movements substantially in the vertical direction relative to said vehicle superstructure in dependence on the spring spring movements of said one wheel, said connecting means including means to cause said axle bearer means to participate in the spring movements of said one wheel only with a partial stroke, and thrust arm guide means having pivot axes extending obliquely to the longitudinal direction of the vehicle for supporting said two swinging half-axle means in the longitudinal direction of the vehicle, said thrust arm guide means being constructed as inclined guide members with the pivot axes thereof inclined at an angle to the vehicle longitudinal axis, the pivot axis of an inclined guide member intersecting a transverse plane passing through the wheel center of the vehicle on the side of said vehicle longitudinal axis opposite the associated vehicle wheel, said axle bearer means being supported on the thrust arm guide means on both sides of the vehicle, said swinging half-axle means being formed principally by rotatable axle shafts rigidly connected with the respective wheels, and one of said swinging half-axle means including also axle gear housing means, by means of which said one swinging half-axle means is pivotally connected with said axle bearer means for swinging movements about a longitudinal swinging axis, an axle gear within said axle gear housing means, and driving joint means for drivingly connecting the other axle shaft forming the other swinging half-axle means with said axle gear, said driving joint means being disposed substantially in said longitudinally swinging axis and forming simultaneously the joint of said other swinging half-axle means, elastic support means for elastically supporting one of the two parts consisting of said axle bearer means and the swinging half-axle means connected with said axle bearer means with respect to said vehicle superstructure in the swinging direction about said longitudinal vehicle axis in such a manner as to return said part to the normal rest position thereof, strut means rigidly connected with said one swinging half-axle means for bracing said one swinging half-axle means at said vehicle superstructure including pivotal connecting means connecting said strut means with said superstructure to provide a transverse pivot axis, said strut means being constructed as a torsionally elastic upright leaf spring element, said axle bearer means being constructed as rigid hollow bearer, said axle bearer means being supported on said thrust arm guide means in places located between the vehicle transverse plane containing said swinging half-axle means and the effective support of said swinging half-axle means at said vehicle superstructure, said axle bearer means being supported also on said thrust arm guide means in places located between the pivot axes thereof at the vehicle superstructure and the operative connection thereof with the swinging half-axle means, universal joint means operatively conneting said swinging half-axle means with thrust arm guide means, the support of said axle bearer means on said thrust arm guide means, on the one hand, and the support of said swinging half-axle means at the vehicle superstructure, on the other, being so arranged that the stroke movements of the inner ends of the swinging half-axle means within the transverse plane through the centers of the wheels amounts to about one-half to one-third of the spring strokes of the wheels with equally large spring strokes of both wheels in the same direction, elastic cushion means for supporting said axle bearer means on said thrust arm guide means, the thrust arm guide means being of approximately star shape and having a plurality of leg portions and being supported at said vehicle superstructure by means of a first leg portion in proximity to the longitudinal vehicle center axis and by means of a second leg portion in proximity to a respective vehicle outer side, while the third leg portion is operatively connected with a respective vehicle wheel, the thrust arm guide means including a main arm provided with one of the bearing eye means thereof and with the pivotal connecting means for the associated swinging half-axle means and an auxiliary arm welded to said main arm at an angle and provided with the other bearing eye means, both of said thrust arm guide means being constituted by hollow sheet-metal stampings, said axle bearer means being supported on the main arm, and spring means for spring-supporting the wheels and resting on said thrust-arm guide means within the area of connection of both arms, and equalization spring means consisting of a coil spring supported in elastic cushion means for spring supporting said axle bearer means against said vehicle superstructure, said equalization spring means being additional to the springs of the spring system for the wheels and being disposed within the area of the vertical longitudinal plane containing said longitudinal swinging axis, the swinging axis of said swinging half-axle means being located approximately at a height at the most equal to the height of the longitudinal swinging axis of the swinging half-axle means.

16. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels.

17. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
said axle bearer means being connected to said thrust arm guide means so as to participate in the spring movements of said one wheel only with a partial stroke.

18. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said half-axle means in substantially the vertical direction relative to said vehicle superstructure in a dependence on the spring movements of at least one of said vehicle wheels,
pivotal means pivotally supporting said swinging half-axle means on said axle bearer means in such a manner as to enable pivotal movement of said swinging half-axle means about said longitudinal vehicle axis.

19. A wheel suspension for independently suspending vehicle wheels from a vehicle superstructure, comprising:
two swinging half-axle means swingable about a substantially longitudinal vehicle axis, each swinging half-axle means connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
said thrust arm guide means being constructed as inclined guide members with the pivot axis thereof inclined at an angle to the vehicle longitudinal axis, the pivot axis of the inclined guide member intersecting a transverse plane passing through the wheel center on the side of said vehicle longitudinal axis opposite the associated vehicle wheel.

20. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
said swinging half-axle means being formed principally by rotatable axle shafts rigidly connected with the respective wheels, and one of said swinging half-axle means including also axle gear housing means by means of which said one swinging half-axle means is pivotally connected with said axle bearer means for swinging movements about a longitudinal swinging axis, an axle gear within said axle gear housing means, and driving joint means for drivingly connecting the other axle shaft forming the other swinging half-axle means with said axle gear, said driving joint means being disposed substantially in said longitudinal swinging axis and forming simultaneously the joint of said other swinging half-axle means,
and elastic support means for elastically supporting one of the two parts consisting of said axle bearer means and the swinging half-axle means connected with said axle bearer means with respect to said vehicle superstructure in the swinging direction about said longitudinal vehicle axis in such a manner as to return said axle bearer means to an about central normal rest position thereof.

21. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
said swinging half-axle means being formed principally by rotatable axle shafts rigidly connected with the respective wheels, and one of said swinging half-axle means including also axle gear housing means by means of which said one swinging half-axle means is pivotally connected with said axle bearer means for swinging movements about a longitudinal swinging axis, an axle gear within said axle gear housing means, and driving joint means for drivingly connecting the other axle shaft forming the other swinging half-axle means with said axle gear, said driving joint means being disposed substantially in said longitudinal swinging axis and forming simultaneously the joint of said other swinging half-axle means,
and elastic support means for elastically supporting one of the two parts consisting of said axle bearer means and the swinging half-axle means connected with said axle bearer means with respect to said vehicle superstructure in the swinging direction about said longitudinal vehicle axis in such a manner as to return said axle bearer means to an about central normal rest position thereof,
and strut means rigidly connected with said one swinging half-axle means for bracing said one swinging half-axle means at said vehicle superstructure including pivotal connecting means connecting said strut means with said superstructure to provide a transverse pivot axis, said strut means being constructed as a torsionally elastic upright leaf spring element.

22. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
the thrust arm guide means being of approximately star shape and having a plurality of leg portions and being supported at said vehicle superstructure by means of a first leg portion in proximity to the longitudinal vehicle center axis and by means of a second leg portion in proximity to a respective vehicle outer side, while the third leg portion is operatively connected with a respective vehicle wheel.

23. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
the pivot axes of said thrust arm guide means being disposed at the height of said longitudinal axis.

24. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of said swinging half-axle means in substantially the vertical direction relative to said vehicle superstructure in dependence on the spring movements of at least one of said vehicle wheels,
the pivot axes of said thrust arm guide means being disposed above said longitudinal axis.

25. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means through said thrust arm guide means for effecting movement of the axis of swinging half-axle means in substantially the vertical direction relative to said vehicle superstructure in dependence on the spring movements of at least one of said vehicle wheels,
the pivot axes of said thrust arm guide means being disposed below said longitudinal axis.

26. A wheel suspension for independently suspending vehicle wheels from a vehicle superstructure, comprising:
two swinging half-axle means swingable about a substantially longitudinal vehicle axis, each swinging half-axle means being connected to a respective vehicle wheel,
thrust arm guide means for supporting said two swinging half-axle means in the longitudinal direction of the vehicle and being pivotable with respect to the vehicle superstructure,
and axle bearer means operatively connected with said swinging half-axle means and said thrust arm guide means for effecting movement of the axis of said swinging half-axle means in substantially the vertical direction relative to said vehicle superstructure in dependence on the spring movements of at least one of said vehicle wheels, and equalization springs means for spring supporting said axle bearer means against said vehicle superstructure, said equalization spring means being additional to the springs of the spring system for the wheels and being disposed within the area of the vertical longitudinal plane containing said longitudinal swinging axis.

References Cited by the Examiner

UNITED STATES PATENTS

| | | | |
|---|---|---|---|
| 2,942,893 | 6/1960 | Nallinger | 180—124.1 |
| 2,983,328 | 5/1961 | Ewart | 180—73 |
| 2,990,901 | 7/1961 | Chayne | 180—73 |
| 3,064,749 | 11/1962 | Muller | 180—73 |

BENJAMIN HERSH, *Primary Examiner.*

A. HARRY LEVY, *Examiner.*